2,841,585
Patented July 1, 1958

United States Patent Office

2,841,585
REACTIONS OF S-TRIAZINE

Christoph J. Grundmann and Alfred Kreutzberger, Columbus, Ohio, assignors to Olin Mathieson Chemical Corporation, a corporation of Virginia No Drawing. Application November 5, 1954
Serial No. 467,230

6 Claims. (Cl. 260—256)

This invention relates to the reactions of s-triazine (1,3,5-triazine) with certain substituted primary amines, and, in particular, provides a process for the synthesis of compounds containing five- and six-membered heterocyclic nuclei including such compounds as imidazole, imidazoline, oxazole, oxazoline, thiazole, thiazoline, pentoxazole, 1,3-[6]-oxazine, pentoxazoline, penthiazole, penthiazoline and related compounds and their derivatives which include compounds of the formula:

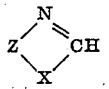

in which Z is an aliphatic, alicyclic, aromatic or heterocyclic carbon nucleus such that the heterocyclic ring consists of 5 or 6 member atoms, X is a divalent radical selected from the group consisting of —NH—, —NR—, —O—, —S—, —Se—. R is an aliphatic, alicyclic, aromatic or heterocyclic group.

Heterocyclic products of this character are derived by the reaction of s-triazine with substituted amines of the formula:

in which Z is a carbon nucleus separating the $NH_2$ and X—H groups by 2 or 3 carbon atoms and in which X and R are defined above.

More particularly, in the process of the present invention, s-triazine reacts with substituted amines of the formulas:

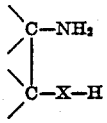

or

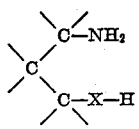

in which the open valences of carbon are attached to hydrogen, other carbon atoms or parts of cyclic ring systems. X has the meaning assigned before.

Examples of suitable starting materials for this reaction are ethylene diamine, 1,3-diaminopropane, o-phenylene diamine, 1,8-naphthalene diamine, o-aminophenol, o-aminothiophenol, o-diaminopiperidines, diaminopyrimidines having both amino groups attached to adjacent carbon atoms, 1,2-diaminocyclohexane, o-aminodiphenylamine and N-methyl-o-phenylenediamine. These starting materials can contain other substituents including alkyl, aryl, halogen, nitro, amino, carbonyl, carboxyl and modified carboxyl groups.

Many useful heterocyclic compounds can be prepared by the process of the present invention including theophylline, benzimidazole, benzoxazole, perimidine and other products useful as pharmaceuticals, intermediates in the synthesis of dyestuffs, resins and as agricultural chemicals.

The reaction of the present invention generally proceeds excellently under very mild conditions. Frequently it is spontaneous on mixing the reactants at room temperature. In other cases it may be necessary to heat the reactants for a short time at temperatures of up to 200° C. or higher. When the substituted amine reactant melts above 200° C., a higher temperature is usually necessary. The only by-product of the reaction is gaseous ammonia, and after completion of the reaction, the heterocyclic product usually remains as a residue in quantitative yield and analytically pure. The product can be recrystallized if desired.

Proportions of amine and triazine are a matter of choice. The reaction proceeds according to the equation:

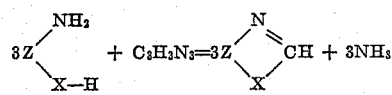

Consequently economics dictate a molar ratio of 3 moles of primary amine to 1 mole of triazine as preferable.

The reaction can also be carried out in an inert solvent including ethers, aliphatic and aromatic hydrocarbons, and chloroform, carbon tetrachloride and other halogenated hydrocarbons.

Example I $$3\begin{array}{c}CH_2NH_2\\|\\CH_2NH_2\end{array} + C_3H_3N_3 \longrightarrow 3\begin{array}{c}CH_2N\\|\phantom{xx}\diagdown\\\phantom{xx}\phantom{xx}CH + 3NH_3\\|\phantom{xx}\diagup\\CH_2NH\end{array}$$

A mixture prepared at room temperature of 7 grams of ethylene diamine with 3 grams of s-triazine started spontaneously to react with evolution of ammonia, so that cooling became necessary. Later the reaction was completed by heating for two hours at 80° C. The reaction product, 8.9 grams of a viscous oil, yielded on vacuum distillation almost quantitatively the 2-imidazoline as an oil which solidified in Dry Ice and then melted at about 40° C. The 2-imidazoline picrate, M. P. 201–2° C. (calculated N 23.41; found N 23.03), was prepared from the components in alcoholic solution. This picrate is remarkably insoluble in all common organic solvents.

Example II $$3\begin{array}{c}\phantom{x}\\NH_2\\NH_2\end{array} + C_3H_3N_3 \longrightarrow 3\begin{array}{c}N\\\diagdown\\CH + 3NH_3\\\diagup\\NH\end{array}$$

A mixture of 8 grams of o-phenylene diamine and 2 grams of s-triazine was gently heated to about 80° C., where the reaction started so violently with evolution of ammonia that the heating bath had to be removed. Later the reaction was completed by heating for two hours at 120–125° C. The remaining solid residue amounted to 8.8 grams or 100% of theory of benzimidazole, which after recrystallization from absolute alcohol melted at 175° C.

Example III $$3\begin{array}{c}CH_3N\!-\!CO\\|\phantom{xx}|\\CO\phantom{x}C.NH_2\\|\phantom{xx}\|\\CH_3N\!-\!C.NH_2\end{array} + C_3H_3N_3 \longrightarrow 3\begin{array}{c}CH_3N\!-\!CO\\|\phantom{xx}|\\CO\phantom{x}C.N\\|\phantom{xx}\|\phantom{xx}\diagdown\\\phantom{xx}\phantom{xx}\phantom{xx}CH + 3NH_3\\|\phantom{xx}\|\phantom{xx}\diagup\\CH_3N\!-\!C.NH\end{array}$$

A mixture of 1.9 grams of dimethyldiaminouracil and 0.3 gram of s-triazine, both finely ground, was placed in a flask immersed in an oil bath preheated to 180° C. Reaction occurred immediately, with evolution of ammonia and sintering. The reaction was complete after half a minute and the product solidified. The reaction mixture was held for one minute at 210° C. and then cooled. The yield of slightly yellow crude theophylline amounted to 99 percent of the theoretical, M. P. 256° C. After one recrystallization from water with some charcoal, a pure product, M. P. 268° C. was obtained.

*Example IV*

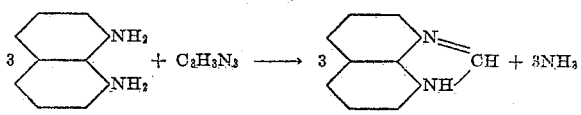

A mixture of 1.3 grams of 1,8-diaminonaphthalene and 0.3 gram of s-triazine (molar ratio, 3:1) was placed in a flask immersed in an oil bath preheated to 150° C. The reaction occurred immediately with evolution of ammonia and was complete after one minute, when the melt resolidified. It was held for 15 minutes more at 150°–160° C. The yield of crude perimidine, M. P. 218–220° C., was 1.4 grams which is the theoretical yield. A pure product was obtained in greenish yellow needles after one crystallization from 30 percent aqueous ethanol, M. P. 224° C.

*Example V*

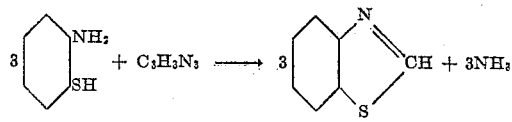

When 2 grams of s-triazine were dissolved in 9.3 grams of o-aminothiophenol (molar ratio 3:1), reaction started at once with evolution of ammonia and heat so that cooling became necessary. The reaction was completed by heating for one hour at 160° C. Yield was 8.4 grams or 85 percent of theory of benzothiazole as a yellow oil. The compound was purified by vacuum fractionation, B. P. 74.5° C./3 mm. and identified by analysis.

Calculated for $C_7H_5SN$: C, 62.20; H, 3.73; N, 10.37.
Found: C, 62.20, 62.05; H, 3.87, 3.94; N, 10.37, 10.32.

*Example VI*

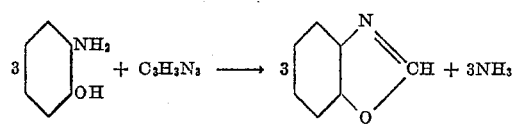

o-Aminophenol (10.1 grams) and s-triazine (2.5 grams) were finely powdered and a mixture of the two was immersed in a flask with reflux condenser in an oil bath preheated to 180° C. Reaction started immediately with evolution of ammonia. The reaction was completed by heating for 2 hours at 160° C. The crude benzoxazole amounted to 9.8 grams or 89 percent of theory of colorless oil which distilled practically completely at 45° C. at 4 mm. $N_D^{25°}=1.5560$.

Calculated for $C_7H_5ON$: C, 70.58; H, 4.23; N, 11.76.
Found: C, 70.54, 70.38; H, 4.31, 4.29; N, 11.52, 11.68.

We claim:

1. A process for preparing heterocyclic compounds which comprises admixing 1,3,5-triazine with a primary amine at a temperature between about room temperature and about 200° C. and in proportions of about 3 moles of primary amine to about 1 mole of 1,3,5-triazine, said primary amine being selected from the group consisting of ethylene diamine, o-phenylene diamine, dimethylaminouracil, 1,8-diaminonaphthalene, o-aminothiophenol and o-aminophenol.

2. A process according to claim 1 in which the primary amine is ethylene diamine.

3. A process according to claim 1 in which the primary amine is o-phenylene diamine.

4. A process according to claim 1 in which the primary amine is dimethyldiaminouracil.

5. A process according to claim 1 in which the primary amine is o-aminothiophenol.

6. A process according to claim 1 in which the primary amine is o-aminophenol.

References Cited in the file of this patent

UNITED STATES PATENTS 2,615,023    Erickson _____ Oct. 21, 1952

OTHER REFERENCES

Migrdichian: The Chemistry of Organic Cyanogen Compounds (1947), pp. 56–7.

Shriner et al.: Chem. Rev., December 1944, p. 372.